US012730667B2

(12) United States Patent
Guim Bernat et al.

(10) Patent No.: US 12,730,667 B2
(45) Date of Patent: Sep. 8, 2026

(54) SWITCH FOR MANAGING SERVICE MESHES

(71) Applicant: Intel Corporation, Santa Clara, CA (US)

(72) Inventors: Francesc Guim Bernat, Barcelona (ES); Karthik Kumar, Chandler, AZ (US); Alexander Bachmutsky, Sunnyvale, CA (US); Marcos E. Carranza, Portland, OR (US); Cesar Ignacio Martinez Spessot, Hillsboro, OR (US)

(73) Assignee: Intel Corporation, Santa Clara, CA (US)

( * ) Notice: Subject to any disclaimer, the term of this patent is extended or adjusted under 35 U.S.C. 154(b) by 0 days.

(21) Appl. No.: 17/561,835

(22) Filed: Dec. 24, 2021

(65) Prior Publication Data

US 2022/0121481 A1 Apr. 21, 2022

(51) Int. Cl.

| | |
|---|---|
| ***G06F 9/48*** | (2006.01) |
| ***G06F 9/50*** | (2006.01) |
| ***G06F 13/40*** | (2006.01) |

(52) U.S. Cl.

CPC .............. *G06F 9/4843* (2013.01); *G06F 9/48* (2013.01); *G06F 9/4881* (2013.01); *G06F 9/50* (2013.01); *G06F 9/5005* (2013.01); *G06F 9/5011* (2013.01); *G06F 9/5016* (2013.01); *G06F 9/505* (2013.01); *G06F 13/4022* (2013.01)

(58) Field of Classification Search

CPC ........ G06F 9/48; G06F 9/4843; G06F 9/4881; G06F 9/50; G06F 9/5005; G06F 9/5011; G06F 9/5016; G06F 9/505; G06F 13/4022; G06F 2209/501; G06F 2209/503; G06F 2209/508

See application file for complete search history.

(56) References Cited

U.S. PATENT DOCUMENTS

| | | | | |
|---|---|---|---|---|
| 10,360,009 | B2 | 7/2019 | Holman et al. | |
| 10,827,020 | B1 | 11/2020 | Cao et al. | |
| 2016/0350146 | A1* | 12/2016 | Udupi | G06F 9/5027 |
| 2017/0206368 | A1* | 7/2017 | Beloussov | G06F 21/6218 |
| 2017/0220944 | A1* | 8/2017 | Nghiem | G06F 9/5066 |
| 2019/0042138 | A1* | 2/2019 | Guim Bernat | G06F 3/0647 |
| 2019/0068696 | A1 | 2/2019 | Sen et al. | |
| 2020/0125503 | A1 | 4/2020 | Graniello et al. | |
| 2020/0127980 | A1* | 4/2020 | Smith | H04L 67/141 |
| 2020/0220848 | A1 | 7/2020 | Patwardhan | |
| 2020/0296172 | A1 | 9/2020 | Gunjal et al. | |
| 2020/0412666 | A1* | 12/2020 | Papadantonakis | H04L 67/10 |

(Continued)

OTHER PUBLICATIONS

International Search Report and Written Opinion for PCT Patent Application No. PCT/US22/48240, Mailed Mar. 2, 2023, 14 pages.

(Continued)

*Primary Examiner* — Charles M Swift

(74) *Attorney, Agent, or Firm* — Compass IP Law PC

(57) ABSTRACT

Examples described herein relate to offload service mesh management and selection of memory pool accessed by services associated with the service mesh to a switch. Based on telemetry data of one or more nodes and network traffic, one or more processes can be allocated to execute on the one or more nodes and a memory pool can be selected to store data generated by the one or more processes.

20 Claims, 6 Drawing Sheets

(56) References Cited

U.S. PATENT DOCUMENTS

2021/0117249 A1 4/2021 Doshi et al.
2022/0004330 A1 * 1/2022 Guim Bernat ........ G06F 3/0631

OTHER PUBLICATIONS

Klinker, Paul, "Performance Impacts of an Istio Service Mesh", https://medium.com/@pklinker/performance-impacts-of-an-istio-service-mesh-63957a0000b, Jun. 25, 2020, 9 pages.
Extended European Search Report for Patent Application No. 22912215.5, Mailed Dec. 9, 2025, 9 pages.

* cited by examiner

SWITCH FOR MANAGING SERVICE MESHES

BACKGROUND

Rapid proliferation of cloud native software execution has resulted in a shift to scale out, distributed software design. For example, an application or service can be executed using a group of microservices and microservices can communicate with other microservices using a network. A service mesh can facilitate communications between microservices. Service meshes can perform monitoring, resource limiting, observability, security, fault tolerance, and other operations in order to control, manage, monitor, and enforce traffic flow compliance for microservices. Service meshes provide an abstraction for administrators to manage access policies specifically for pods or containers in a cloud cluster.

DETAILED DESCRIPTION

For example, an application that performs image recognition can be decomposed into multiple microservices executing on a same or different node and that communicate as part of a service mesh. Microservice UM0 can store an image, microservice UM1 can cause or perform an inference operation for image recognition, and microservice UM2 can cause or perform post processing of the recognized image. As a number of services and computing resources increase in number, service meshes that are implemented in software experience performance overheads and encounter bottlenecks. With cloud native applications, a growing area of focus is function as a service (FaaS) deployments. With multitudes of users executing short lived functions, load balancing and distributing traffic evenly across resources can be challenging. Another challenge is routing requests between services at different nodes and coordinating execution of services considering both load balancing, cold start time, and function initialization times.

To help alleviate bottlenecks associated with distributed software execution, a switch can select one or more target nodes that execute microservices based on one or more of: (1) status of various platforms capable to execute functions or services; (2) load balancing of execution of services based on status of the network and monitored latency of communications with nodes that execute microservices; (3) availability and use of pooled memory to store data generated and used by microservices; and (4) registration of new function providers.

Figure 1:
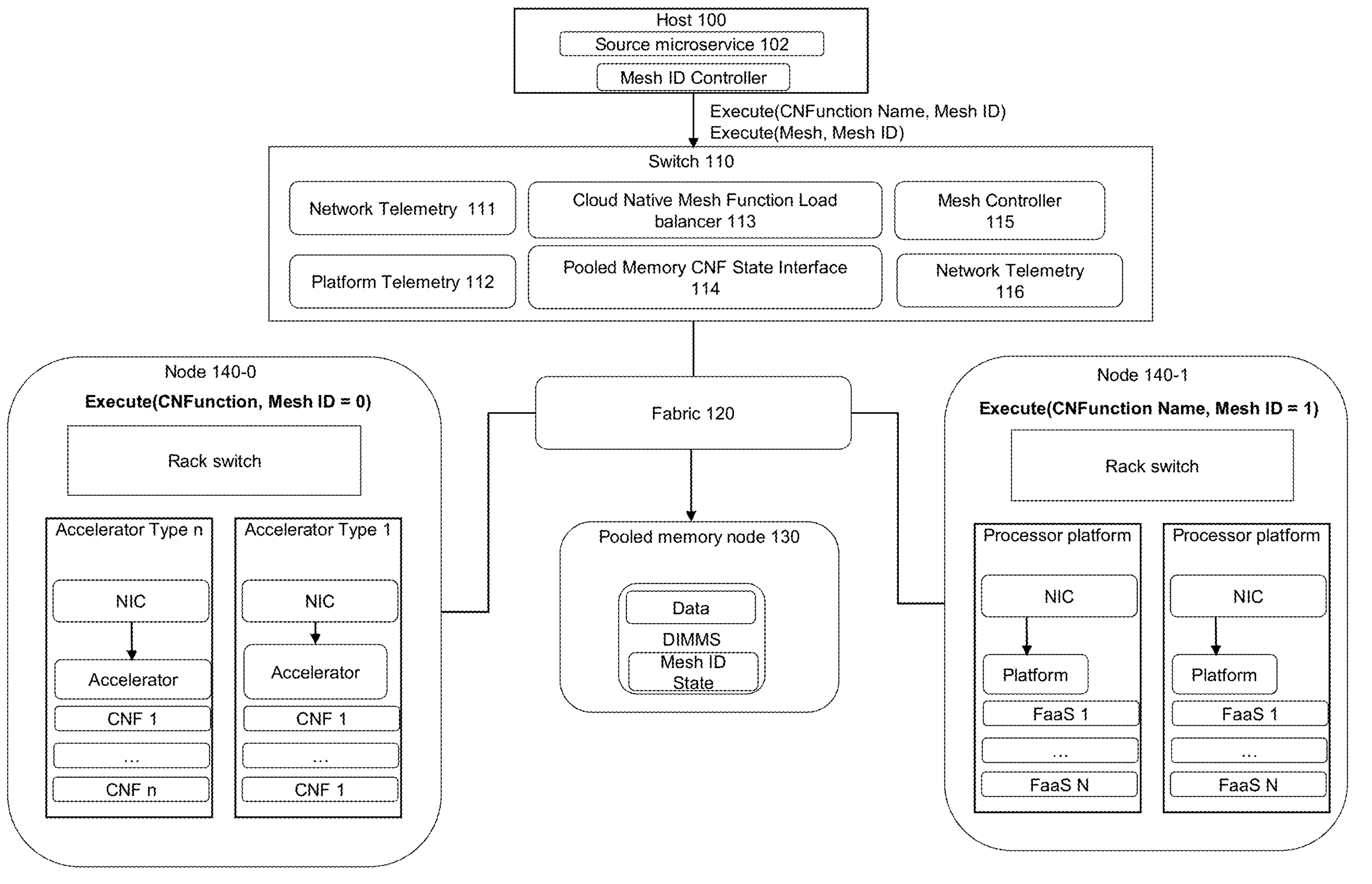
FIG. 1 provides a system diagram.

FIG. 1 provides a system diagram. Host 100 executes source microservice 102 using one or more processor devices or circuitry. Host 100 communicates with switch 110 using a sender network interface device (not shown) or device interface. In some examples, switch 110 is one hop (e.g., one network device away from the sender network interface device) from a node that executes source microservice 102. Host 100 can issue one or more commands to switch 110 in the form of application program interfaces (APIs). An interface can allow source microservice 102 to request execution of a particular named function by specifying one or more of: named function, tenant, or time metric SLA for completion of a function. For example, interface Execute (CNFunction Name, Mesh ID) can be used to request execution of a target microservice on node 140-0 or node 140-1. Field CNFunction Name can be represented by a function ID and can identify a target microservice. Field Mesh ID can represent an identifier of a specific instance of a mesh, among multiple instances of meshes. Although two nodes are depicted, more or fewer nodes can be used to execute target microservices that are requested to be performed next by a microservice executing on host 100.

Source microservice 102 and/or host 100 can utilize an interface with switch 110 to define a mesh of a named function execution. In response, switch 110 can generate a graph of named functions and define the dependencies among the functions and an SLA associated with the mesh. The SLA associated with the mesh can be specific to a function to be executed or associated with a mesh of multiple functions, to allow flexibility to manage the network and resources to achieve SLA targets for a function and/or mesh.

For example, Execute(Mesh, Mesh ID) can be used to cause storage of data accessed or generated by a function or microservice executing on host 100, node 140-0, or node 140-1 into a memory pool such as pooled memory node 130. Pooled memory node 130 can include one or more dual in-line memory modules (DIMMs) or other types of volatile and/or non-volatile memory. Field Mesh can represent a mesh type (e.g., person detection, inference, or other operation). Field Mesh ID can represent an identifier of a specific instance of a mesh, among multiple instances of meshes.

For example, mesh controller 115 can select pooled memory (e.g., pooled memory node 130) and cause the selected pooled memory to store and propagate mesh state to one or more nodes that execute source and/or target functions. Mesh state can include data and/or progress indications generated by services or functions associated with a service mesh associated with a particular Mesh ID.

Switch 110 can receive or collect network telemetry 111. Network telemetry 111 can represent latency and bandwidth of data transmissions between nodes (e.g., nodes 140-0, 140-1, and/or host 100).

Switch 110 can receive or collect platform telemetry 112. Platform telemetry 112 can represent, for node that runs a microservice, utilization of hardware resources (e.g., central processing unit (CPU), graphics processing unit (GPU), accelerator, network interface device, memory, storage, and other devices) as well as performance of a microservice executing thereon. An interface (e.g., API) can allow receipt of telemetry associated with a given function name implemented in a particular platform. Example telemetry can include one or more of: current load on the platform, current expected completion time for the function execution (including queuing and others), next expected available slots for the function in the platform, time to complete execution of a microservice, frames processed per second, and/or other measurements of microservice performance. Example telemetry of a memory pool can include an available amount of memory space (addresses) and latency and/or bandwidth to one or more nodes that are capable of executing a target process in the mesh to the memory pool.

Switch 110 can utilize Cloud Native Mesh Function (CNMF) load balancer 113 to select a node that executes a target microservice or cause a node to execute a target microservice based on network and platform telemetry and quality of service (QoS) level specified by source microservice 102 or host 100. CNMF load balancer 113 can load balance execution of microservices among nodes while attempting to achieve the SLAs associated with microservice execution and completion of an entire group of microservices. CNMF load balancer 113 can perform load balancing of instances of target microservices among nodes to attempt to prevent performance degradation of a target microservice due to a node's resources being overly utilized.

Switch 110 can utilize pooled memory CNF 114 to provide an interface for source microservice 102 or host 100 to indicate to a pooled memory node (e.g., node 130) to store data. For example, data can be data generated by source microservice 102 or host 100 and that is to be processed by a target microservice and/or data generated by a target microservice that is to be processed by another target microservice or source microservice 102. Use of pooled memory to store data generated or used by services associated with a service mesh can reduce data movement between nodes by data being accessed from a memory pool instead of being transferred from source node to target node that executes a subsequent service. If data is not accessed by a target node that executes a subsequent service associated with a service mesh, data transmissions can be reduced and network utilization reduced as well. However, in some examples, data can be transmitted to a node that executes a next target service in a service mesh.

Switch 110 can utilize mesh controller 115 to select a pooled memory node and node to execute a target micro service. Mesh controller 115 can schedule functions to be executed as part of a service mesh. Mesh controller 115 can utilize network features such as telemetry, service or mesh QoS, and end point telemetry (e.g., usage of the various function providers for a given named function) to decide when and to what node to select to perform a specific execution of a particular function.

Mesh controller 115 can execute and schedule one or more meshes of microservices based on a graph with a set of named functions along with an SLA. Mesh controller 115 can cause execution of a part or entirety of a mesh of services and can use a pooled memory to store and propagate data and mesh state to the multiple function providers at various nodes. Mesh controller 115 can migrate or copy some of the states to other memory pools depending on where the functions are executed and based on the network state to attempt to satisfy an SLA for a function and/or its mesh.

Mesh controller 115 can manage the named functions that the infrastructure provides such as instances that are added or removed as well as manage multi-tenant aspects (e.g., name and tenant-based function routing, tenant based quality of service based, etc.). An interface (e.g., API) allows registration of new named functions such as one or more of: Function Name (e.g., unique for a tenant), Tenant ID, optional meta-data indicating what a function performs (e.g., image recognition), hardware that is to execute the function (e.g., field programmable gate array (FPGA) based, graphics processing unit (GPU) based, application specific circuit (ASIC) based, and so forth), end point implementing the function (e.g., media access control (MAC) address or Internet protocol (IP) address), and/or SLA of the function. An interface can be used to update or delete a given function.

Switch 110 can utilize network telemetry 116 to retrieve or collect latency or bandwidth of data transmission rates from switch 110 to host 100, switch 110 to node 140-0, switch 110 to node 140-1, and/or from switch 110 to pooled memory node 130. In some examples, pooled memory node 130 can be a network accessible memory pool. In some examples, pooled memory node 130 can be part of memory devices of a compute node or server that can also perform one or more functions or microservices.

Memory pool 130 can include one or more dual in-line memory modules (DIMMs), or other volatile or non-volatile memory devices. At least two levels of memory (alternatively referred to herein as "2LM") can be used that includes cached subsets of system disk level storage (in addition to, for example, run-time data). This main memory includes a first level (alternatively referred to herein as "near memory") including smaller faster memory made of, for example, dynamic random access memory (DRAM) or other volatile memory; and a second level (alternatively referred to herein as "far memory") which includes larger and slower (with respect to the near memory) volatile memory (e.g., DRAM) or nonvolatile memory storage (e.g., flash memory or byte addressable non-volatile memory (e.g., Intel Optane®)). The far memory is presented as "main memory" to the host operating system (OS), while the near memory is a cache for the far memory that is transparent to the OS, thus rendering the embodiments described below to appear the same as prior art main memory solutions. The management of the two-level memory may be done by a combination of logic and modules executed via the host central processing unit (CPU). Near memory may be coupled to the host system CPU via high bandwidth, low latency means for efficient processing. Far memory may be coupled to the CPU via low bandwidth, high latency means (as compared to that of the near memory). In some examples, memory pool 130 can be included in far memory.

Nodes 140-0 and 140-1 can be configured to execute services or functions of a service mesh. In some examples, node 140-0 can include one or more accelerators that can execute one or more functions. In some examples, node 140-1 can include one or more processors that can execute one or more functions. Other devices can be available for execution of services.

Various examples described herein can perform an application composed of microservices, where a microservice runs in its own process and communicates using protocols (e.g., application program interface (API), a Hypertext Transfer Protocol (HTTP) resource API, message service, remote procedure calls (RPC), or Google RPC (gRPC)). Microservices can communicate with one another using a service mesh and be executed in one or more data centers or edge networks. Microservices can be independently deployed using centralized management of these services. The management system may be written in different programming languages and use different data storage technologies. A microservice can be characterized by one or more of: polyglot programming (e.g., code written in multiple languages to capture additional functionality and efficiency not available in a single language), or lightweight container or virtual machine deployment, and decentralized continuous microservice delivery.

Microservice 102 can refer instead or additionally to a virtual machine (VM), container, processor, or other software. A processor or core can execute a microservice within a virtualized execution environment. A virtualized execution environment (VEE) can include at least a virtual machine or a container. VEEs can execute in bare metal (e.g., single tenant) or hosted (e.g., multiple tenants) environments. A virtual machine (VM) can be software that runs an operating system and one or more applications. A VM can be defined by specification, configuration files, virtual disk file, non-volatile random access memory (NVRAM) setting file, and the log file and is backed by the physical resources of a host computing platform. A VM can be an OS or application environment that is installed on software, which imitates dedicated hardware. The end user has the same experience on a virtual machine as they would have on dedicated hardware. Specialized software, called a hypervisor, emulates the PC client or server's CPU, memory, hard disk, network and other hardware resources completely, enabling virtual machines to share the resources. The hypervisor can emulate multiple virtual hardware platforms that are isolated from each other, allowing virtual machines to run Linux®, FreeBSD, VMWare, or Windows® Server operating systems on the same underlying physical host.

A container can be a software package of applications, configurations and dependencies so the applications run reliably on one computing environment to another. Containers can share an operating system installed on the server platform and run as isolated processes. A container can be a software package that contains everything the software needs to run such as system tools, libraries, and settings. Containers are not installed like traditional software programs, which allows them to be isolated from the other software and the operating system itself. Isolation can include permitted access of a region of addressable memory or storage by a particular container but not another container. The isolated nature of containers provides several benefits. First, the software in a container will run the same in different environments. For example, a container that includes PHP and MySQL can run identically on both a Linux computer and a Windows® machine. Second, containers provide added security since the software will not affect the host operating system. While an installed application may alter system settings and modify resources, such as the Windows® registry, a container can only modify settings within the container.

A virtualized infrastructure manager (VIM) or hypervisor (not shown) can manage the life cycle of a VEE (e.g., creation, maintenance, and tear down of VEEs associated with one or more physical resources), track VEE instances, track performance, fault and security of VEE instances and associated physical resources, and expose VEE instances and associated physical resources to other management systems.

Figure 2:
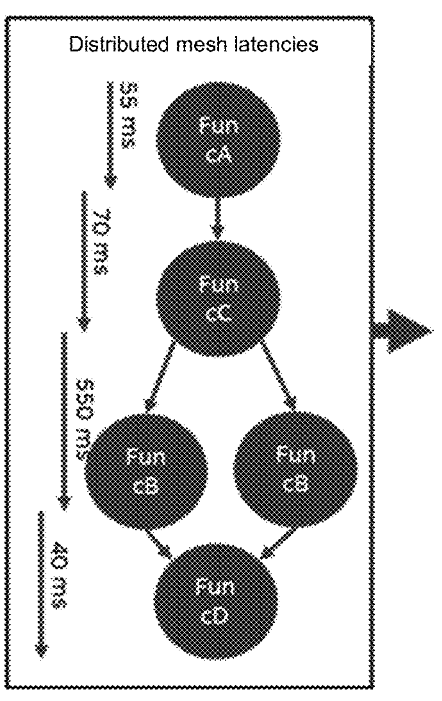
FIG. 2 depicts an example of latencies for multiple functions in a defined mesh.

FIG. 2 depicts an example of latencies for multiple functions in a defined mesh. For example, a service mesh of functions (Fun) A, C, B, and D can be defined based on a graph and associated SLA parameters. Based on SLA parameters, time to complete function A can be up to 55 ms, time to complete function C can be up to 70 ms, time to complete function B can be up to 550 ms, and time to complete function D can be up to 40 ms. Selection of nodes to execute various functions A, B, C, and D as well as memory pool to store the telemetry data and data can be determined based on per-function time to completion, specified in an SLA, or end-to-end latency of mesh completion (e.g., completion of functions A-D), specified in an SLA, as described herein.

Figure 3:
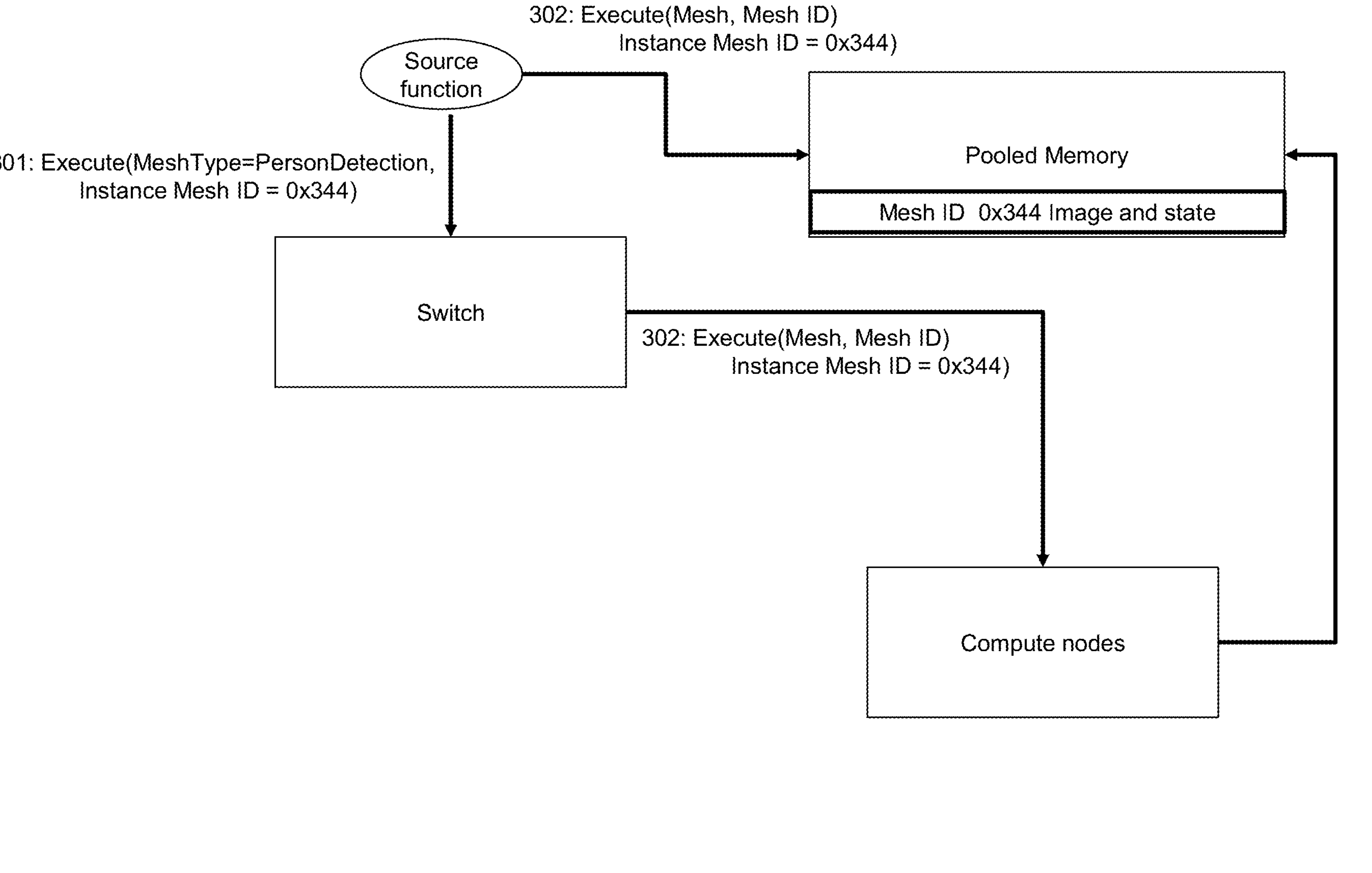
FIG. 3 depicts an example operation given mesh latencies.

FIG. 3 depicts an example operation given mesh latencies. At 301, a source function can issue a request to perform a mesh that is to identify a person (MeshType=person detection) and identify the mesh using Mesh ID=0x344. At 302, the source function can issue a request to reserve memory in a memory pool to store mesh data and state and compute nodes to allocate compute resources to perform one or more functions of the mesh. The amount of memory in a memory pool and/or memory device to be allocated in response to the request can be specified by the source function.

Figure 4:
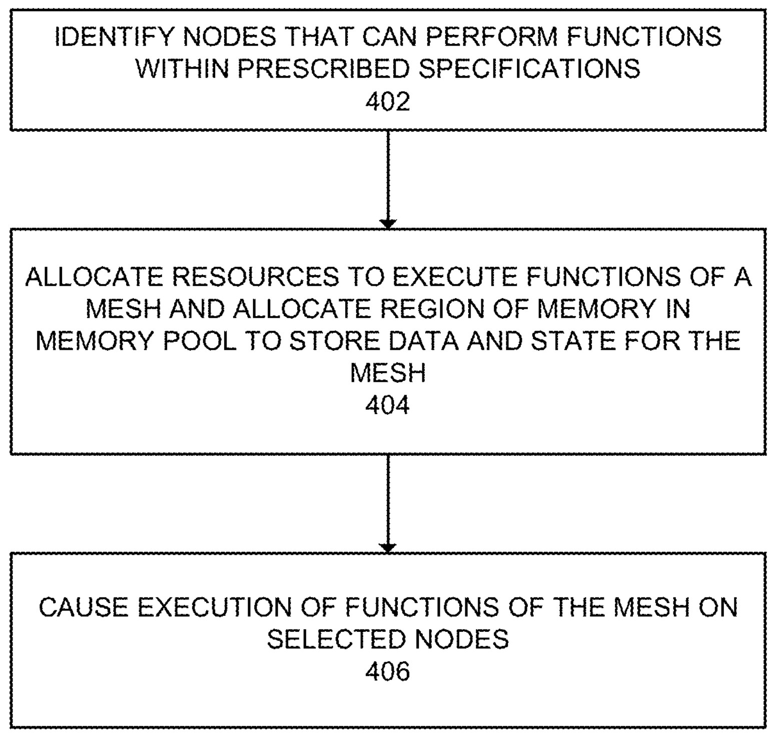
FIG. 4 depicts an example process.

FIG. 4 depicts an example process. The process can be performed by a switch circuitry in some examples. At 402, in response to receipt of a request to execute particular named function, the switch can filter functions that match the specified SLA for the function. The SLA can be identified by one or more of: network latency to transfer the data from the pooled memory to the function provider, if any data is to be transferred; network latency to send a request to the function provider; current estimated time to perform the named function in the specific node; or other parameters described herein. Note that estimated time to perform the named function in the specific node can be provided at function registration or learned over time. For a set of different candidate nodes, the switch may perform load balancing across them in order to maximize load balancing at compute and/or network levels.

At 404, based on a request to define a mesh of function executions, the switch can perform one or more of the following operations. The switch can allocate resources to process the mesh and create a mesh tracker with the functions to be executed as well as latencies of function execution as functions are executed. The switch can allocate resources in the memory pool to store state and/or data generated by a source or target function. Data stored in the memory pool can be propagated to the various nodes that perform functions and from various nodes that perform functions to the memory pool. In some cases, telemetry data can be stored in the memory pool and accessed by a tenant. At 406, the switch can cause execution of one or more target functions in the mesh based on the graph. The target functions can access and/or store data to the identified memory pool.

Figure 5:
FIG. 5 depicts an example switch.
Figure 5:
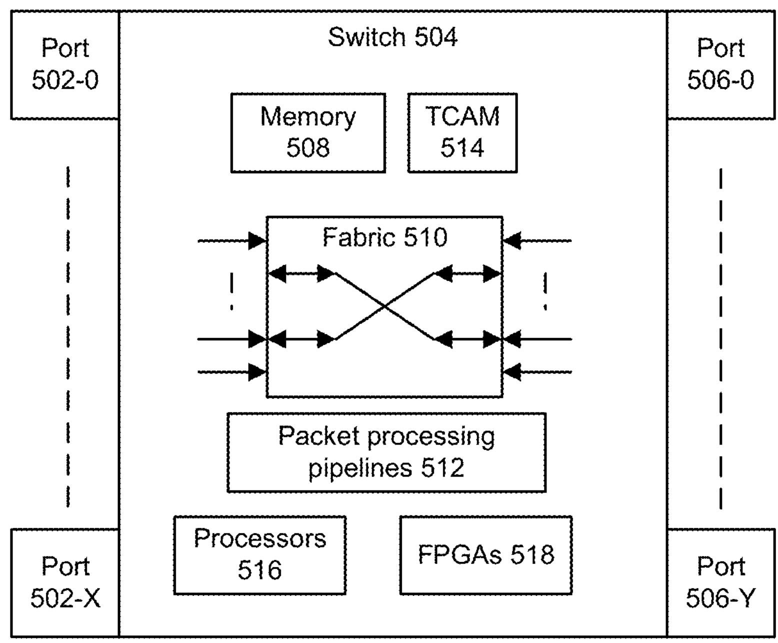

FIG. 5 depicts an example switch. Various examples can be used in or with the switch to determine nodes to execute functions and a memory pool or device to store state and data generated by services of a service mesh, as described herein. Switch 504 can route packets or frames of any format or in accordance with any specification from any port 502-0 to 502-X to any of ports 506-0 to 506-Y (or vice versa). Any of ports 502-0 to 502-X can be connected to a network of one or more interconnected devices. Similarly, any of ports 506-0 to 506-Y can be connected to a network of one or more interconnected devices.

In some examples, switch fabric 510 can provide routing of packets from one or more ingress ports for processing prior to egress from switch 504. Switch fabric 510 can be implemented as one or more multi-hop topologies, where example topologies include torus, butterflies, buffered multi-stage, etc., or shared memory switch fabric (SMSF), among other implementations. SMSF can be any switch fabric connected to ingress ports and all egress ports in the switch, where ingress subsystems write (store) packet segments into the fabric's memory, while the egress subsystems read (fetch) packet segments from the fabric's memory.

Memory 508 can be configured to store packets received at ports prior to egress from one or more ports. Packet processing pipelines 512 can determine which port to transfer packets or frames to using a table that maps packet characteristics with an associated output port. Packet processing pipelines 512 can be configured to perform match-action on received packets to identify packet processing rules and next hops using information stored in a ternary content-addressable memory (TCAM) tables or exact match tables in some embodiments. For example, match-action tables or circuitry can be used whereby a hash of a portion of a packet is used as an index to find an entry. Packet processing pipelines 512 can implement access control list (ACL) or packet drops due to queue overflow. Packet processing pipelines 512 can be configured to determine nodes to execute functions and a memory pool or device to store state and data generated by services of a service mesh, as described herein.

Configuration of operation of packet processing pipelines 512, processors 516, and/or FPGA 518 can be programmed using Programming Protocol-independent Packet Processors (P4), C, Python, Broadcom Network Programming Language (NPL), or x86 compatible executable binaries or other executable binaries. Processors 516 and FPGAs 518 can be utilized for packet processing or modification.

Figure 6:
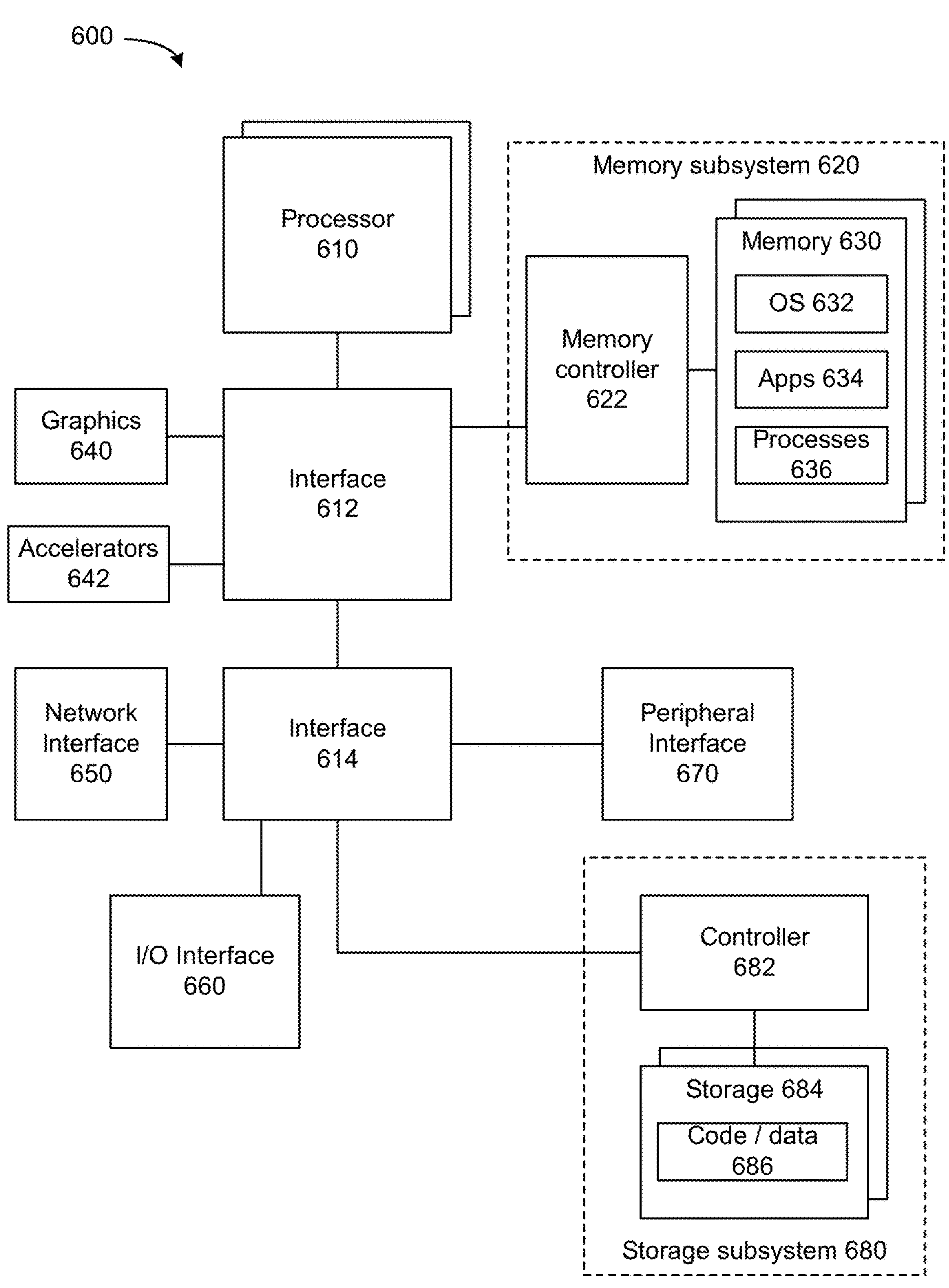
FIG. 6 depicts an example computing system.

FIG. 6 depicts a system. The system can use embodiments described herein to offload to a switch determination of nodes to execute microservices of a service mesh and select a memory pool or device to store data and state associated with or generated by micro services of the service mesh. System 600 includes processor 610, which provides processing, operation management, and execution of instructions for system 600. Processor 610 can include any type of microprocessor, central processing unit (CPU), graphics processing unit (GPU), XPU, processing core, or other processing hardware to provide processing for system 600, or a combination of processors. An XPU can include one or more of: a CPU, a graphics processing unit (GPU), general purpose GPU (GPGPU), and/or other processing units (e.g., accelerators or programmable or fixed function FPGAs). Processor 610 controls the overall operation of system 600, and can be or include, one or more programmable general-purpose or special-purpose microprocessors, digital signal processors (DSPs), programmable controllers, application specific integrated circuits (ASICs), programmable logic devices (PLDs), or the like, or a combination of such devices.

In one example, system 600 includes interface 612 coupled to processor 610, which can represent a higher speed interface or a high throughput interface for system components that needs higher bandwidth connections, such as memory subsystem 620 or graphics interface components 640, or accelerators 642. Interface 612 represents an interface circuit, which can be a standalone component or integrated onto a processor die. Where present, graphics interface 640 interfaces to graphics components for providing a visual display to a user of system 600. In one example, graphics interface 640 can drive a high definition (HD) display that provides an output to a user. High definition can refer to a display having a pixel density of approximately 100 PPI (pixels per inch) or greater and can include formats such as full HD (e.g., 1080p), retina displays, 4K (ultra-high definition or UHD), or others. In one example, the display can include a touchscreen display. In one example, graphics interface 640 generates a display based on data stored in memory 630 or based on operations executed by processor 610 or both. In one example, graphics interface 640 generates a display based on data stored in memory 630 or based on operations executed by processor 610 or both.

Accelerators 642 can be a programmable or fixed function offload engine that can be accessed or used by a processor 610. For example, an accelerator among accelerators 642 can provide compression (DC) capability, cryptography services such as public key encryption (PKE), cipher, hash/authentication capabilities, decryption, or other capabilities or services. In some embodiments, in addition or alternatively, an accelerator among accelerators 642 provides field select controller capabilities as described herein. In some cases, accelerators 642 can be integrated into a CPU socket (e.g., a connector to a motherboard or circuit board that includes a CPU and provides an electrical interface with the CPU). For example, accelerators 642 can include a single or multi-core processor, graphics processing unit, logical execution unit single or multi-level cache, functional units usable to independently execute programs or threads, application specific integrated circuits (ASICs), neural network processors (NNPs), programmable control logic, and programmable processing elements such as field programmable gate arrays (FPGAs). Accelerators 642 can provide multiple neural networks, CPUs, processor cores, general purpose graphics processing units, or graphics processing units can be made available for use by artificial intelligence (AI) or machine learning (ML) models. For example, the AI model can use or include any or a combination of: a reinforcement learning scheme, Q-learning scheme, deep-Q learning, or Asynchronous Advantage Actor-Critic (A3C), combinatorial neural network, recurrent combinatorial neural network, or other AI or ML model. Multiple neural networks, processor cores, or graphics processing units can be made available for use by AI or ML models.

Memory subsystem 620 represents the main memory of system 600 and provides storage for code to be executed by processor 610, or data values to be used in executing a routine. Memory subsystem 620 can include one or more memory devices 630 such as read-only memory (ROM), flash memory, one or more varieties of random access memory (RAM) such as DRAM, or other memory devices, or a combination of such devices. Memory 630 stores and hosts, among other things, operating system (OS) 632 to provide a software platform for execution of instructions in system 600. Additionally, applications 634 can execute on the software platform of OS 632 from memory 630. Applications 634 represent programs that have their own operational logic to perform execution of one or more functions. Processes 636 represent agents or routines that provide auxiliary functions to OS 632 or one or more applications 634 or a combination. OS 632, applications 634, and processes 636 provide software logic to provide functions for system 600. In one example, memory subsystem 620 includes memory controller 622, which is a memory controller to generate and issue commands to memory 630. It will be understood that memory controller 622 could be a physical part of processor 610 or a physical part of interface 612. For example, memory controller 622 can be an integrated memory controller, integrated onto a circuit with processor 610.

While not specifically illustrated, it will be understood that system 600 can include one or more buses or bus systems between devices, such as a memory bus, a graphics bus, interface buses, or others. Buses or other signal lines can communicatively or electrically couple components together, or both communicatively and electrically couple the components. Buses can include physical communication lines, point-to-point connections, bridges, adapters, controllers, or other circuitry or a combination. Buses can include, for example, one or more of a system bus, a Peripheral Component Interconnect (PCI) bus, a Hyper Transport or industry standard architecture (ISA) bus, a small computer system interface (SCSI) bus, a universal serial bus (USB), or an Institute of Electrical and Electronics Engineers (IEEE) standard 1394 bus (Firewire).

In one example, system 600 includes interface 614, which can be coupled to interface 612. In one example, interface 614 represents an interface circuit, which can include standalone components and integrated circuitry. In one example, multiple user interface components or peripheral components, or both, couple to interface 614. Network interface 650 provides system 600 the ability to communicate with remote devices (e.g., servers or other computing devices) over one or more networks. Network interface 650 can include an Ethernet adapter, wireless interconnection components, cellular network interconnection components, USB (universal serial bus), or other wired or wireless standards-based or proprietary interfaces. Network interface 650 can transmit data to a device that is in the same data center or rack or a remote device, which can include sending data stored in memory. Network interface 650 can receive data from a remote device, which can include storing received data into memory.

Processor 610 and network interface 650 can offload, to a switch, determination of nodes to execute microservices of a service mesh and select a memory pool or device to store data and state associated with or generated by microservices of the service mesh. In one example, system 600 includes one or more input/output (I/O) interface(s) 660. I/O interface 660 can include one or more interface components through which a user interacts with system 600 (e.g., audio, alpha-numeric, tactile/touch, or other interfacing). Peripheral interface 670 can include any hardware interface not specifically mentioned above. Peripherals refer generally to devices that connect dependently to system 600. A dependent connection is one where system 600 provides the software platform or hardware platform or both on which operation executes, and with which a user interacts.

In one example, system 600 includes storage subsystem 680 to store data in a nonvolatile manner. In one example, in certain system implementations, at least certain components of storage 680 can overlap with components of memory subsystem 620. Storage subsystem 680 includes storage device(s) 684, which can be or include any conventional medium for storing large amounts of data in a non-volatile manner, such as one or more magnetic, solid state, or optical based disks, or a combination. Storage 684 holds code or instructions and data 686 in a persistent state (e.g., the value is retained despite interruption of power to system 600). Storage 684 can be generically considered to be a "memory," although memory 630 is typically the executing or operating memory to provide instructions to processor 610. Whereas storage 684 is nonvolatile, memory 630 can include volatile memory (e.g., the value or state of the data is indeterminate if power is interrupted to system 600). In one example, storage subsystem 680 includes controller 682 to interface with storage 684. In one example controller 682 is a physical part of interface 614 or processor 610 or can include circuits or logic in both processor 610 and interface 614.

A volatile memory is memory whose state (and therefore the data stored in it) is indeterminate if power is interrupted to the device. Dynamic volatile memory requires refreshing the data stored in the device to maintain state. One example of dynamic volatile memory incudes DRAM (Dynamic Random Access Memory), or some variant such as Synchronous DRAM (SDRAM). Another example of volatile memory includes cache or static random access memory (SRAM). A memory subsystem as described herein may be compatible with a number of memory technologies, such as standards released by JEDEC (Joint Electronic Device Engineering Council) on Jun. 27, 2007).

A non-volatile memory (NVM) device is a memory whose state is determinate even if power is interrupted to the device. In some embodiments, the NVM device can comprise a block addressable memory device, such as NAND technologies, or more specifically, multi-threshold level NAND flash memory (for example, Single-Level Cell ("SLC"), Multi-Level Cell ("MLC"), Quad-Level Cell ("QLC"), Tri-Level Cell ("TLC"), or some other NAND). A NVM device can also comprise a byte-addressable write-in-place three dimensional cross point memory device, or other byte addressable write-in-place NVM device (also referred to as persistent memory), such as single or multi-level Phase Change Memory (PCM) or phase change memory with a switch (PCMS), Intel® Optane™ memory, NVM devices that use chalcogenide phase change material (for example, chalcogenide glass), or other memory.

A power source (not depicted) provides power to the components of system 600. More specifically, power source typically interfaces to one or multiple power supplies in system 600 to provide power to the components of system 600. In one example, the power supply includes an AC to DC (alternating current to direct current) adapter to plug into a wall outlet. Such AC power can be renewable energy (e.g., solar power) power source. In one example, power source includes a DC power source, such as an external AC to DC converter. In one example, power source or power supply includes wireless charging hardware to charge via proximity to a charging field. In one example, power source can include an internal battery, alternating current supply, motion-based power supply, solar power supply, or fuel cell source.

In an example, system 600 can be implemented using interconnected compute sleds of processors, memories, storages, network interfaces, and other components. High speed interconnects can be used such as PCIe, Ethernet, or optical interconnects (or a combination thereof).

Embodiments herein may be implemented in various types of computing and networking equipment, such as switches, routers, racks, and blade servers such as those employed in a data center and/or server farm environment. The servers used in data centers and server farms comprise arrayed server configurations such as rack-based servers or blade servers. These servers are interconnected in communication via various network provisions, such as partitioning sets of servers into Local Area Networks (LANs) with appropriate switching and routing facilities between the LANs to form a private Intranet. For example, cloud hosting facilities may typically employ large data centers with a multitude of servers. A blade comprises a separate computing platform that is configured to perform server-type functions, that is, a "server on a card." Accordingly, each blade includes components common to conventional servers, including a main printed circuit board (main board) providing internal wiring (e.g., buses) for coupling appropriate integrated circuits (ICs) and other components mounted to the board.

Various examples may be implemented using hardware elements, software elements, or a combination of both. In some examples, hardware elements may include devices, components, processors, microprocessors, circuits, circuit elements (e.g., transistors, resistors, capacitors, inductors, and so forth), integrated circuits, ASICs, PLDs, DSPs, FPGAs, memory units, logic gates, registers, semiconductor device, chips, microchips, chip sets, and so forth. In some examples, software elements may include software components, programs, applications, computer programs, application programs, system programs, machine programs, operating system software, middleware, firmware, software modules, routines, subroutines, functions, methods, procedures, software interfaces, APIs, instruction sets, computing code, computer code, code segments, computer code segments, words, values, symbols, or any combination thereof. Determining whether an example is implemented using hardware elements and/or software elements may vary in accordance with any number of factors, such as desired computational rate, power levels, heat tolerances, processing cycle budget, input data rates, output data rates, memory resources, data bus speeds and other design or performance constraints, as desired for a given implementation. It is noted that hardware, firmware and/or software elements may be collectively or individually referred to herein as "module," or "logic." A processor can be one or more combination of a hardware state machine, digital control logic, central processing unit, or any hardware, firmware and/or software elements.

Some examples may be implemented using or as an article of manufacture or at least one computer-readable medium. A computer-readable medium may include a non-transitory storage medium to store logic. In some examples, the non-transitory storage medium may include one or more types of computer-readable storage media capable of storing electronic data, including volatile memory or non-volatile memory, removable or non-removable memory, erasable or non-erasable memory, writeable or re-writeable memory, and so forth. In some examples, the logic may include various software elements, such as software components, programs, applications, computer programs, application programs, system programs, machine programs, operating system software, middleware, firmware, software modules, routines, subroutines, functions, methods, procedures, software interfaces, API, instruction sets, computing code, computer code, code segments, computer code segments, words, values, symbols, or any combination thereof.

According to some examples, a computer-readable medium may include a non-transitory storage medium to store or maintain instructions that when executed by a machine, computing device or system, cause the machine, computing device or system to perform methods and/or operations in accordance with the described examples. The instructions may include any suitable type of code, such as source code, compiled code, interpreted code, executable code, static code, dynamic code, and the like. The instructions may be implemented according to a predefined computer language, manner or syntax, for instructing a machine, computing device or system to perform a certain function. The instructions may be implemented using any suitable high-level, low-level, object-oriented, visual, compiled and/or interpreted programming language.

One or more aspects of at least one example may be implemented by representative instructions stored on at least one machine-readable medium which represents various logic within the processor, which when read by a machine, computing device or system causes the machine, computing device or system to fabricate logic to perform the techniques described herein. Such representations, known as "IP cores" may be stored on a tangible, machine readable medium and supplied to various customers or manufacturing facilities to load into the fabrication machines that actually make the logic or processor.

The appearances of the phrase "one example" or "an example" are not necessarily all referring to the same example or embodiment. Any aspect described herein can be combined with any other aspect or similar aspect described herein, regardless of whether the aspects are described with respect to the same figure or element. Division, omission or inclusion of block functions depicted in the accompanying figures does not infer that the hardware components, circuits, software and/or elements for implementing these functions would necessarily be divided, omitted, or included in embodiments.

Some examples may be described using the expression "coupled" and "connected" along with their derivatives. These terms are not necessarily intended as synonyms for each other. For example, descriptions using the terms "connected" and/or "coupled" may indicate that two or more elements are in direct physical or electrical contact with each other. The term "coupled," however, may also mean that two or more elements are not in direct contact with each other, but yet still co-operate or interact with each other.

The terms "first," "second," and the like, herein do not denote any order, quantity, or importance, but rather are used to distinguish one element from another. The terms "a" and "an" herein do not denote a limitation of quantity, but rather denote the presence of at least one of the referenced items. The term "asserted" used herein with reference to a signal denote a state of the signal, in which the signal is active, and which can be achieved by applying any logic level either logic 0 or logic 1 to the signal. The terms "follow" or "after" can refer to immediately following or following after some other event or events. Other sequences of operations may also be performed according to alternative embodiments. Furthermore, additional operations may be added or removed depending on the particular applications. Any combination of changes can be used and one of ordinary skill in the art with the benefit of this disclosure would understand the many variations, modifications, and alternative embodiments thereof.

Disjunctive language such as the phrase "at least one of X, Y, or Z," unless specifically stated otherwise, is otherwise understood within the context as used in general to present that an item, term, etc., may be either X, Y, or Z, or any combination thereof (e.g., X, Y, and/or Z). Thus, such disjunctive language is not generally intended to, and should not, imply that certain embodiments require at least one of X, at least one of Y, or at least one of Z to each be present. Additionally, conjunctive language such as the phrase "at least one of X, Y, and Z," unless specifically stated otherwise, should also be understood to mean X, Y, Z, or any combination thereof, including "X, Y, and/or Z."'

Illustrative examples of the devices, systems, and methods disclosed herein are provided below. An embodiment of the devices, systems, and methods may include any one or more, and any combination of, the examples described below.

Flow diagrams as illustrated herein provide examples of sequences of various process actions. The flow diagrams can indicate operations to be executed by a software or firmware routine, as well as physical operations. In some embodiments, a flow diagram can illustrate the state of a finite state machine (FSM), which can be implemented in hardware and/or software. Although shown in a particular sequence or order, unless otherwise specified, the order of the actions can be modified. Thus, the illustrated embodiments should be understood only as an example, and the process can be performed in a different order, and some actions can be performed in parallel. Additionally, one or more actions can be omitted in various embodiments; thus, not all actions are required in every embodiment. Other process flows are possible.

Various components described herein can be a means for performing the operations or functions described. Each component described herein includes software, hardware, or a combination of these. The components can be implemented as software modules, hardware modules, special-purpose hardware (e.g., application specific hardware, application specific integrated circuits (ASICs), digital signal processors (DSPs), etc.), embedded controllers, hardwired circuitry, and so forth.

Example 1 includes one or more examples, and includes a switch comprising circuitry to: based on telemetry data of one or more nodes and network traffic, select one or more processes to execute on the one or more nodes and select a memory pool to store data generated by the one or more processes, wherein the one or more processes comprise a source process and at least one target process.

Example 2 includes one or more examples, wherein the telemetry data of the one or more nodes comprises one or more of: current load on the one or more nodes, current expected completion time for process execution on the one or more nodes, and/or expected available resources on the one or more nodes.

Example 3 includes one or more examples, wherein the telemetry data of the network traffic comprises one or more of: latency and/or bandwidth of communications from the switch to the one or more nodes.

Example 4 includes one or more examples, wherein the telemetry data of one or more nodes comprises telemetry associated with the memory pool and includes one or more of: an available amount of memory space and latency and/or bandwidth between the one or more nodes and the memory pool.

Example 5 includes one or more examples, wherein the switch is to determine a graph of the one or more processes and corresponding nodes of the one or more nodes to execute the one or more processes and cause execution of the one or more processes on the corresponding nodes.

Example 6 includes one or more examples, wherein the one or more processes are to access data from the memory pool.

Example 7 includes one or more examples, wherein the switch comprises one or more of: a network interface controller (NIC), SmartNIC, router, forwarding element, infrastructure processing unit (IPU), or data processing unit (DPU).

Example 8 includes one or more examples, and includes a host to execute the source process and wherein the host is communicatively coupled to the switch using a network interface device.

Example 9 includes one or more examples, and includes a data center that comprises the one or more nodes that execute the one or more processes.

Example 10 includes one or more examples, and includes a computer-readable medium comprising instructions stored thereon, that if executed by one or more processors, cause the one or more processors to: offload service mesh management and selection of memory pool accessed by services associated with the service mesh to a switch.

Example 11 includes one or more examples, wherein offload service mesh management and selection of memory pool accessed by services associated with the service mesh to a switch comprises: cause the switch to, based on telemetry data of one or more nodes and network traffic, select one or more processes to execute on the one or more nodes and select a memory pool to store data generated by the one or more processes.

Example 12 includes one or more examples, wherein the one or more processes are to write data to the memory pool and/or access data from the memory pool.

Example 13 includes one or more examples, wherein the telemetry data of the one or more nodes comprises one or more of: current load on the one or more nodes, current expected completion time for process execution on the one or more nodes, and/or expected available resources on the one or more nodes and the telemetry data of the network traffic comprises one or more of: latency and/or bandwidth of communications from the switch to the one or more nodes.

Example 14 includes one or more examples, wherein the telemetry data of one or more nodes comprises telemetry associated with the memory pool and includes one or more of: an available amount of memory space and latency and/or bandwidth between the one or more nodes and the memory pool.

Example 15 includes one or more examples, wherein the switch is to determine a graph of the one or more processes and corresponding nodes of the one or more nodes to execute the one or more processes and cause execution of the one or more processes on the corresponding nodes.

Example 16 includes one or more examples, and includes a method comprising: allocating a memory pool to store data accessed and generated by microservices associated with a mesh based on telemetry data associated with one or more nodes.

Example 17 includes one or more examples, wherein the telemetry data associated with one or more nodes comprises one or more of: current load on one or more nodes, current expected completion time for microservices execution on the one or more nodes, and/or expected available resources on the one or more nodes.

Example 18 includes one or more examples, wherein the telemetry data associated with one or more nodes comprises telemetry associated with the memory pool and includes one or more of: an available amount of memory space and latency and/or bandwidth between one or more nodes and the memory pool.

Example 19 includes one or more examples, and includes causing execution of the microservices on nodes based on the telemetry data associated with one or more nodes.

Example 20 includes one or more examples, wherein the microservices are to write data to the memory pool and/or access data from the memory pool.

What is claimed is:

1. An apparatus comprising:

a switch circuitry comprising:

an interface to an ingress port;

an interface to an egress port;

a switch fabric; and circuitry to:

load balance processes among one or more nodes, wherein the load balance processes among one or more nodes comprises:

based on telemetry data of the one or more nodes and network traffic of packets among the one or more nodes, select one or more processes to execute on the one or more nodes and select a memory pool to store data generated by the one or more processes, wherein;

the one or more processes are to communicate via a service mesh, the one or more processes comprise microservices, and the select one or more processes to execute on the one or more nodes comprises migrate the one or more processes from execution by a first circuitry of a first node to execution by a second circuitry of a second node.

2. The apparatus of claim 1, wherein the telemetry data of the one or more nodes comprises two or more of: current load on the one or more nodes, current expected completion time for process execution on the one or more nodes, and/or expected available resources on the one or more nodes.

3. The apparatus of claim 2, wherein the telemetry data of the network traffic comprises: latency and bandwidth of communications among the one or more nodes via the service mesh.

4. The apparatus of claim 2, wherein the telemetry data of the one or more nodes comprises telemetry associated with the memory pool and includes one or more of: an available amount of memory space and latency and/or bandwidth between the one or more nodes and the memory pool.

5. The apparatus of claim 1, wherein the switch circuitry is to determine a graph of the one or more processes and corresponding nodes of the one or more nodes to execute the one or more processes and cause execution of the one or more processes on the corresponding nodes.

6. The apparatus of claim 1, wherein the one or more processes are to access data from the selected memory pool.

7. The apparatus of claim 1, wherein the switch circuitry comprises one or more of: a network interface controller (NIC), SmartNIC, router, forwarding element, infrastructure processing unit (IPU), or data processing unit (DPU).

8. The apparatus of claim 1, comprising a host system to execute at least one of the one or more processes and wherein the host system is communicatively coupled to the switch using a network interface device.

9. The apparatus of claim 8, comprising a data center that comprises the one or more nodes that execute the one or more processes.

10. The apparatus of claim 1, wherein the circuitry is to:
based on the telemetry data of the one or more nodes and the network traffic, migrate data associated with a process of the one or more processes to a second memory pool for access by the one or more nodes and wherein the telemetry data comprises expected completion time for process execution on the one or more nodes.

11. At least one non-transitory computer-readable medium comprising instructions stored thereon, that if executed by one or more processors, cause the one or more processors to:
offload, to a switch: load balancing processes among one or more nodes, service mesh management, and selection of memory pool accessed by services associated with the service mesh, wherein:
the switch comprises an interface to an ingress port, an interface to an egress port, and a switch fabric,
the switch is to select one or more processes to execute on the one or more nodes and select a memory pool to store data generated by the one or more processes based on telemetry data of the one or more nodes communicatively coupled to the switch and network traffic of packets transmitted among the one or more nodes,
the one or more processes comprise microservices,
the one or more processes are to communicate via a service mesh, and
the select one or more processes to execute on the one or more nodes comprises migrate the one or more processes from execution by a first circuitry of a first node to execution by a second circuitry of a second node.

12. The computer-readable medium of claim 11, wherein offload service mesh management and selection of memory pool accessed by services associated with the service mesh to the switch comprises: cause the switch to, based on telemetry data of one or more nodes and network traffic, change a node of execution of the one or more processes and change the memory pool to store data generated by the one or more processes.

13. The computer-readable medium of claim 12, wherein the one or more processes are to write data to the selected memory pool and/or access data from the selected memory pool.

14. The computer-readable medium of claim 12, wherein
the telemetry data of the one or more nodes comprises: current load on the one or more nodes, current expected completion time for process execution on the one or more nodes, and expected available resources on the one or more nodes and
the telemetry data of the network traffic comprises one or more of: latency and/or bandwidth of communications between the nodes.

15. The computer-readable medium of claim 12, wherein the telemetry data of one or more nodes comprises telemetry associated with the memory pool and includes one or more of: an available amount of memory space and latency and/or bandwidth between the one or more nodes and the memory pool.

16. The computer-readable medium of claim 12, wherein the switch is to determine a graph of the one or more processes and corresponding nodes of the one or more nodes to execute the one or more processes and cause execution of the one or more processes on the corresponding nodes.

17. A method comprising:
a switch performing:
load balancing processes among one or more nodes, wherein the load balancing processes among one or more nodes comprises:
allocating a memory pool to store data accessed and generated by microservices that communicate using a service mesh based on telemetry data associated with the one or more nodes and
causing execution of the microservices on nodes based on the telemetry data associated with the one or more nodes, wherein:
the switch comprises: an interface to an ingress port, an interface to an egress port, and a switch fabric, and
the causing execution of the microservices on nodes based on the telemetry data associated with the one or more nodes comprises migrating at least one of the microservices from execution by a first circuitry of a first node to execution by a second circuitry of a second node.

18. The method of claim 17, wherein the telemetry data associated with one or more nodes comprises two or more of: current load on one or more nodes, current expected completion time for microservices execution on the one or more nodes, and/or expected available resources on the one or more nodes.

19. The method of claim 17, wherein the telemetry data associated with one or more nodes comprises telemetry associated with the memory pool and includes one or more of: an available amount of memory space and latency and/or bandwidth between one or more nodes and the memory pool.

20. The method of claim 17, wherein the microservices are to write data to the allocated memory pool and/or access data from the allocated memory pool.

* * * * *